J. B. EADS.
PIPE-JOINTS FOR PUMPING AND DREDGING APPARATUS.
No. 189,436. Patented April 10, 1877.
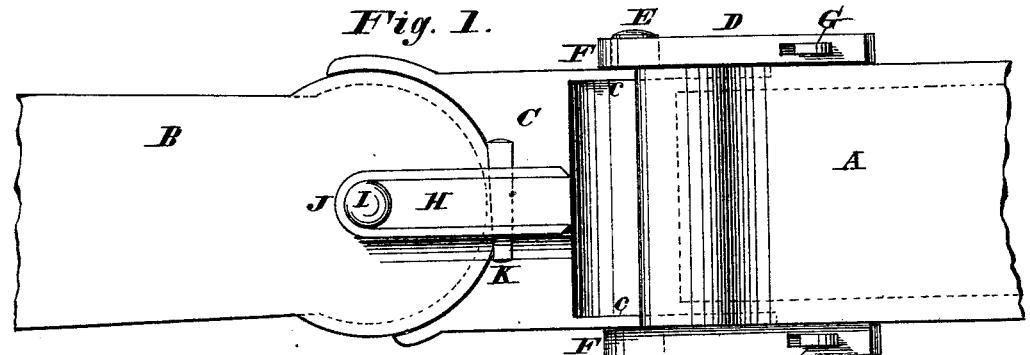
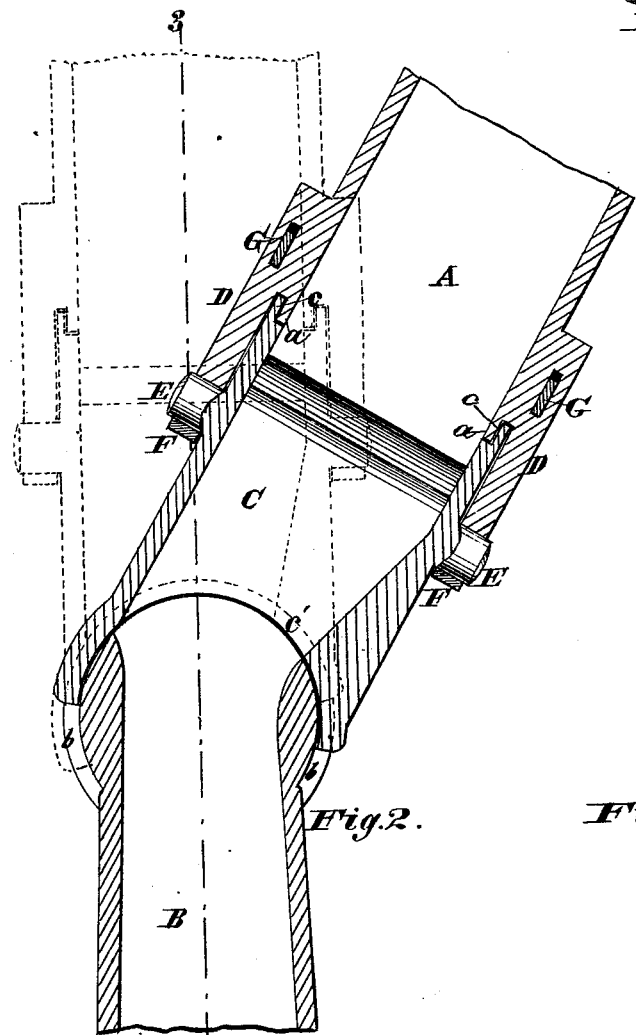
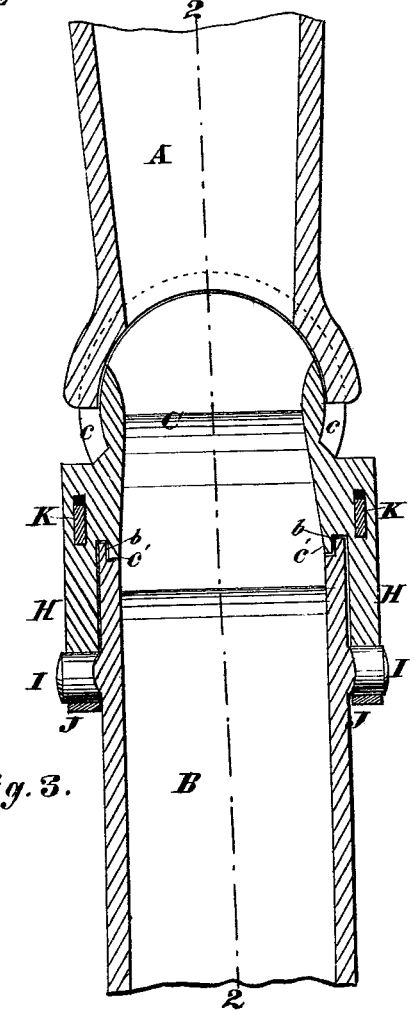
WITNESSES
Chas J. Gooch
L. Blond Burdett
INVENTOR
James B. Eads
By Knight Bros, Attorneys 2 Sheets—Sheet 2

J. B. EADS.
PIPE-JOINTS FOR PUMPING AND DREDGING APPARATUS.

No. 189,436. Patented April 10, 1877.

WITNESSES
Chas. J. Gooch
L. Bond Burdett

INVENTOR
James B. Eads
By Knight Bros., Attorneys

UNITED STATES PATENT OFFICE.

JAMES B. EADS, OF ST. LOUIS, MISSOURI.

IMPROVEMENT IN PIPE-JOINTS FOR PUMPING AND DREDGING APPARATUS.

Specification forming part of Letters Patent No. 189,436, dated April 10, 1877; application filed March 9, 1877.

*To all whom it may concern:*

Be it known that I, JAMES B. EADS, of St. Louis, Missouri, have invented certain new and useful Improvements in Pipe-Joints for Pumping and Dredging Apparatus, of which the following is a specification:

My invention consists in constructing a pipe coupling or connection, so as to be flexible in two directions in planes at right angles to each other, thus constituting a universal joint. To this end I construct a double knuckle-joint, as hereinafter described, adapted for application or use in connection with a pipe, trunk, or conductor of any description, for the passage of liquid or semiliquid matter.

Figure 4:
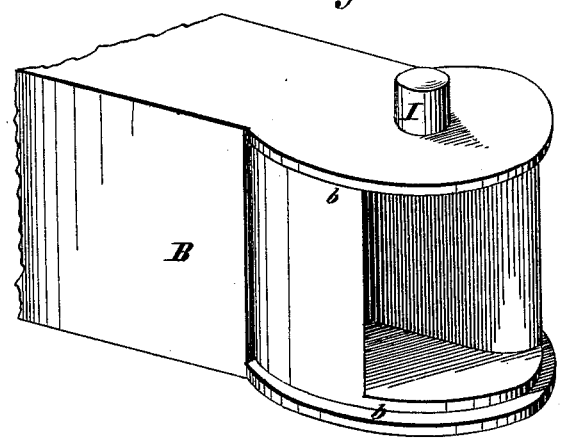
Figure 5:
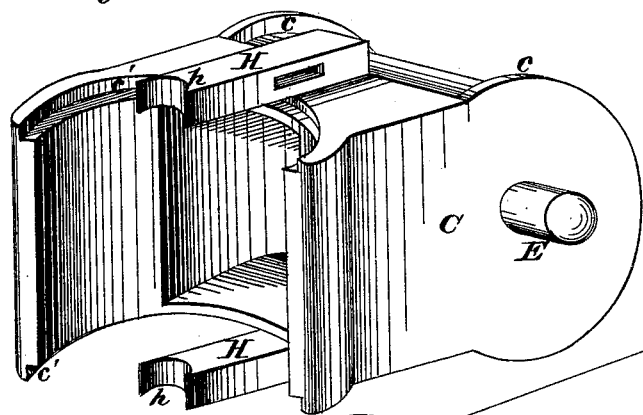
Figure 6:
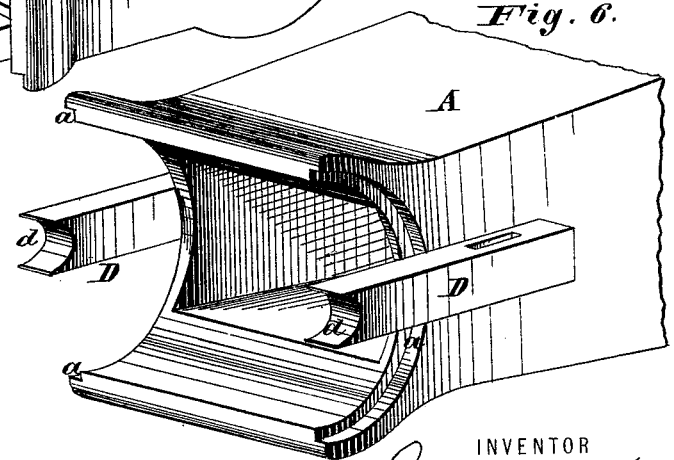

In the accompanying drawing, Figure 1 is a side elevation of my improved joint. Fig. 2 is a vertical section of the same on the line 2 2, Fig. 3. Fig. 3 is a horizontal section on the line 3 3, Fig. 1. Figs. 4, 5, and 6 are perspective views with the different members of the joint detached.

A B may represent sections of a pipe of any description to which the joint is to be applied. C is an interposed member formed at its respective ends with convex and concave faces adapted to work upon the corresponding concave and convex faces of the pipe ends A B. The intermediate member C (shown in perspective in Fig. 5) may be constructed with both faces or ends convex, or both concave, or the concave and convex ends may be, respectively, transposed, the face of the pipes A B, in connection with which they are to work, being formed to correspond. In the present illustration I have shown the pipe end A (which, for convenience of description, may be designated as stationary) with concave rabbet-joints $a\ a$, within which the convex rabbeted edges $c\ c$ of the knuckle C fit. D D represent ears or lugs rigidly fixed to the sides of the pipe A, and having at their ends cylindrical seats $d\ d$, concentric with the arcs formed by the rabbet-joints $a\ a$, and adapted for the reception of gudgeons or trunnions E, which project from the sides of the knuckle C, in position concentric with its convex ends $c$. F F are straps fitting over the trunnions E, and secured by keys G G passing through the lugs or ears D D, so as to hold the said trunnions securely to their seats or bearings $d\ d$. The intermediate member or knuckle C is provided with lugs or ears H H, which are similarly formed with concave trunnion seats or bearings $h$, for the reception of the trunnions I I, which project from each side of the pipe end B, in position concentric with the arcs formed by the convex extremity of said pipe end. J J are straps secured by keys K K, so as to hold the trunnions I I within their seats or bearings $h$. The meeting convex and concave extremities of the section B and interposed knuckle C are formed with rabbets $b$ and $c'$, so as to fit tightly together while admitting of free play, as in the case of the joint $a\ c$, the flexure of the second joint $b\ c'$ being in a plane at right angles to that of the first joint $a\ c$, so that the two combine to form in effect a universal joint.

It will be observed, from the construction of the members of the coupling, that the joint may be bent in either direction without closing the throat or passage through the joint.

The lugs D D and H H are designed to prevent the rabbeted surfaces from being forced against each other, either by accident or atmospheric pressure, (suction,) whereby the surfaces might be caused to wear or cut away if gritty or sandy material were being forced or drawn through the pipe.

Having thus described my invention, the following is what I claim as new and desire to secure by Letters Patent:

1. The pipe-coupling herein described, consisting of the three members A B C, fitting together with rabbeted knuckle-joints, and moving in planes at right angles to each other.

2. The combination with the coupling-sections A C and their rabbet-joints $a$, of the lugs D D and gudgeons E E, for sustaining pressure and relieving the rabbet-joints, as described.

3. The combination of the coupling-sections A C, rabbet-joints $a$, gudgeons E E, lugs D D, and straps F F, substantially as and for the purposes set forth.

In testimony of which invention I hereunto set my hand this 17th day of February, A. D. 1877.

JAS. B. EADS.

Witnesses:
FRANK B. CONGER,
J. G. KIMBALL.